W. & M. C. WALKER.
Churn.
No. 7,554.
Patented Aug. 6, 1850.
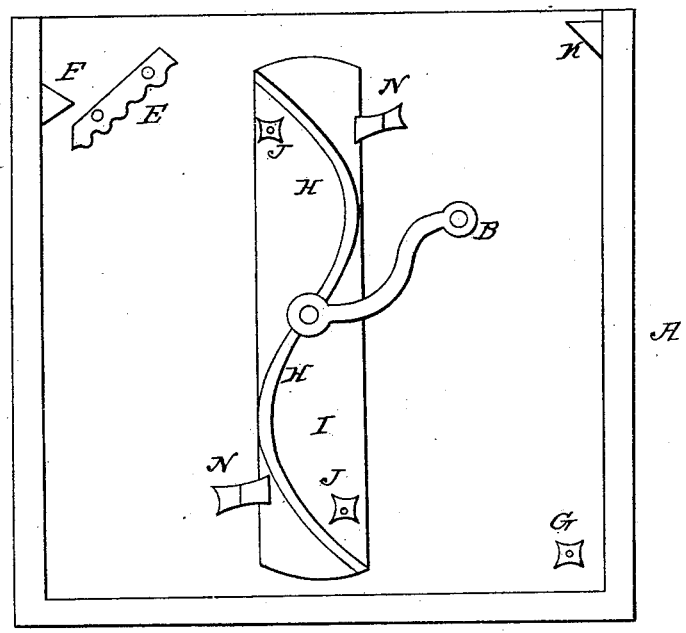
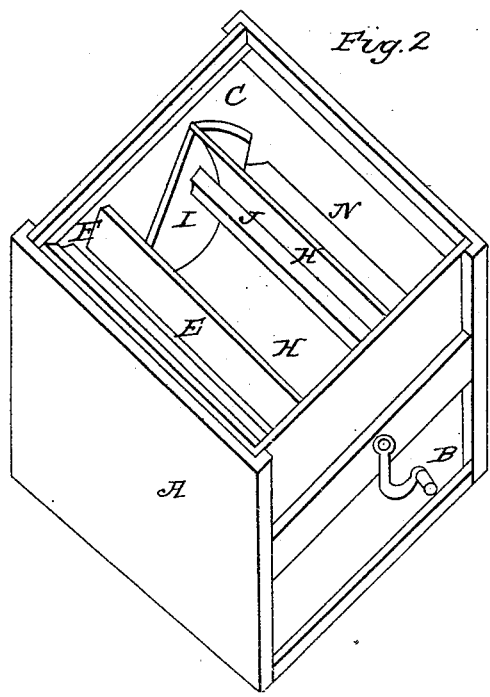
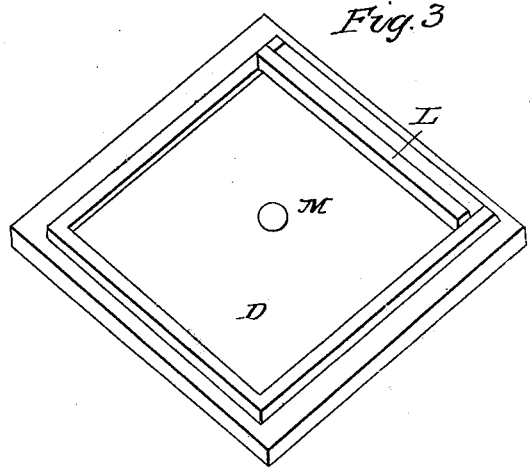

UNITED STATES PATENT OFFICE.

W. WALKER AND M. C. WALKER, OF LANCASTER, PENNSYLVANIA.

CHURN-DASHER.

Specification of Letters Patent No. 7,554, dated August 6, 1850.

*To all whom it may concern:*

Be it known that we, WILLIAM WALKER and MATTHEW C. WALKER, of Lancaster city, county of Lancaster, and State of Pennsylvania, have invented a new and useful Machine for Churning and Making Butter; and we do hereby declare that the following is a full and exact description thereof, reference being had to the accompanying drawings, and to the letters of reference marked thereon, making a part of this specification, Figure 1 being an end view, Fig. 2 a perspective view, and Fig. 3 an underside view, of lid.

To enable others skilled in the art to make and use our invention we will proceed to describe its construction and operation.

We construct of boards an inch in thickness, a square water tight box about 14 inches square each way, to hold for ordinary uses about 40 quarts of milk or cream. In this box we fix a double curved or S shaped dasher, which revolves in the center by a crank or handle attached at one end and a thumb screw at the other end. We then pour in the milk or cream until the box or churn is half filled.

A represents the box with the handle B on the end; C, the ledge at top of box to support and confine the lid D close.

E is an inclined friction board grooved underneath and extending lengthwise across the top of the box, and permanently fastened at each end, inclining downward to the left side of box to within ¾ of an inch of the side, so that the cream may fall over the inclination, the lower side being grooved assists in increasing the friction, and as the milk passes over the incline it dashes against the side of the box where another triangular shaped board F attached to side of box, returns the cream upon the incline E, prevents the cream from dashing against the edge of lid D and assists in washing down the cream from off the incline board E; G, a grooved cross piece fastened permanently to each end near the lower right hand corner of box, with a space on all sides, and between it and the dasher H, likewise for the purpose of increasing friction; H, the dasher, double curved or S shaped having two flat ends I to support or preserve its shape, and having four grooved cross pieces J, J, and N N; the two pieces J J of one kind, being both square and alike, and the other two N, N of an other kind being both wider and flatter and also alike, and attached firmly to the ends I extending lengthwise across the dasher, on each side of the curved ends—with a space between the dasher and the grooved pieces J and N, being thus fastened on each side of dasher for the purpose of creating friction, and as the churn is put in operation, the cream is thrown against the grooves of the incline board E, dashed around and under it, and passed over and against the friction piece G, in the right hand corner of box, while the ends of the dasher H and wide cross piece N keep the cream continually dashing against the grooves of the incline board E thus keeping up a constant friction on all sides.

K is a projecting angular ledge or strip at the top of box which receives a corresponding projecting strip L on lid D underside for the purpose of securing the lid close and tight to the top of box; M, the aperture in lid D through which the air passes.

What we claim as our invention and desire to secure by Letters Patent is—

The double curved S shaped, dasher H, with the grooved pieces J, J and N N in combination as herein described, for the purposes herein set forth.

WILLIAM WALKER.
MATTHEW C. WALKER.

Witnesses:
WM. T. AMIBEG,
P. DONNELLY.